W. E. TAFT.
FAUCET OR VALVE.
APPLICATION FILED FEB. 17, 1914.

1,160,342.

Patented Nov. 16, 1915.

Witnesses:
R. M. Mowry.
B. A. Seaver.

Inventor;
Walter E. Taft.

COLUMBIA PLANOGRAPH CO., WASHINGTON, D. C.

UNITED STATES PATENT OFFICE.

WALTER E. TAFT, OF PROVIDENCE, RHODE ISLAND.

FAUCET OR VALVE.

1,160,342.  Specification of Letters Patent.  Patented Nov. 16, 1915.

Application filed February 17, 1914.  Serial No. 819,298.

*To all whom it may concern:*

Be it known that I, WALTER E. TAFT, a citizen of the United States, residing at Providence, in the county of Providence and State of Rhode Island, have invented new and useful Improvements in Faucets or Valves, of which the following is a specification.

My invention relates to that class of faucets or valves wherein the plug or valve proper is a hollow cylindrical valve usually separated at one side on a line with its axis for resilient action to press the valve to its seat either by the spring action of the metal or by the pressure of the fluid on the inside of the plug or valve or both the spring action and the pressure of the fluid. My invention differs materially from these both in construction and operation and is more durable, positive and simple in its action.

The object of my invention is to produce a simple, quick opening and closing valve, durable and economical in construction and positive in its action. The pressure of the valve to its seat is entirely under the control of the operator, being so controlled by the pressure exerted on the handle to open and close the valve.

Its novel features will be hereinafter more fully described and definitely set forth in the claims.

Figure 1:
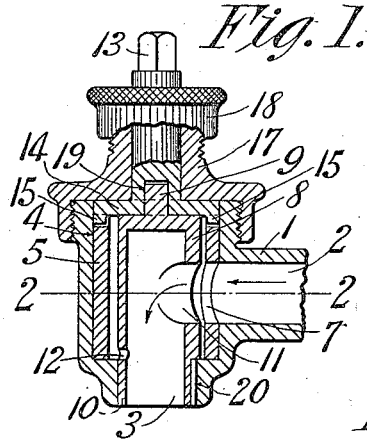
Figure 2:
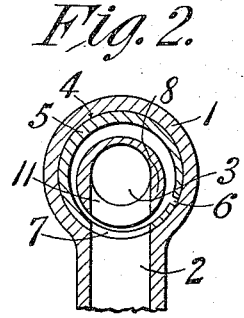
Figure 3:
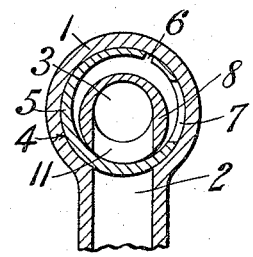
Figures 4, 8:
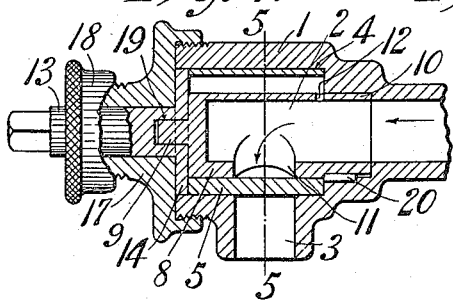
Figure 5:
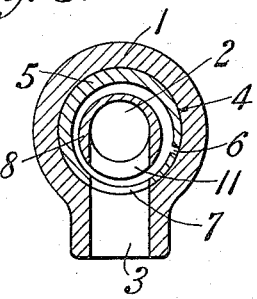
Figure 6:
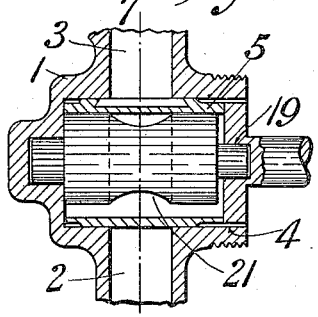
Figure 7:
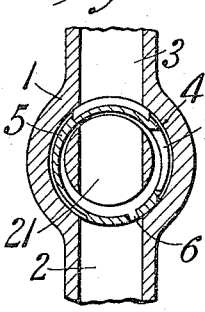
Figures 9, 10:
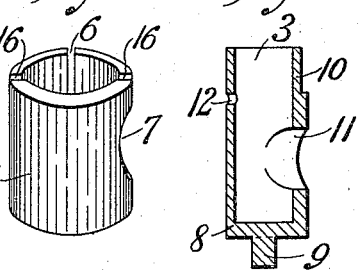
Figure 11:
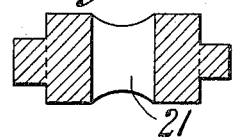
Figure 12:
Figure 13:
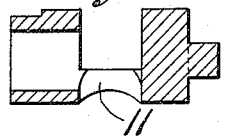
Figure 14:

In the drawings which serve to illustrate my invention, Figure 1 is a vertical view of my cock or valve partially in section. Fig. 2 is a section taken on the line 2—2, of Fig. 1, showing the position of the valve open for the admission of the fluid. Fig. 3 is a section taken on the line 2—2 of Fig. 1 showing the valve closed. In Figs. 1, 2 and 3, the valve is shown as constructed to close against the inlet. Fig. 4 is a view partially in section of a modification showing a longitudinal cock with the valve seated against the outlet. Fig. 5 is a section taken on the line 5—5 of Fig. 4 showing the position of the valve open. Fig. 6 represents a modification of a straightway faucet partially in section showing a valve seated against the outlet and having an inserted seat on the valve. Fig. 7 represents a section taken on the line 7—7 of Fig. 6. Fig. 8 represents a perspective view of the operating stem. Fig. 9 represents a perspective view of the valve. Fig. 10 represents a view in section of the eccentric for holding the valve to its seat. Fig. 11 represents a view of a solid eccentric with a fluid passage through it at right angles to its axis, and as used in construction shown in Fig. 6. Fig. 12 represents an end view of same. Fig. 13 represents a modification of an eccentric or cam for holding the valve to its seat. Fig. 14 is an end view of the same.

Referring to the drawings, 1 is the body of the valve, provided with an inlet passage 2, an outlet passage 3, and a cylindrical bore or valve chamber 4, and as shown in Fig. 1 at right angles to the inlet passage 2, and of a uniform diameter to receive the valve.

5 is the body of the valve proper, which is in the form of a hollow cylinder having its inner wall eccentric to the outside, and provided with a slit 6 through its entire length on one side, and, as shown in Fig. 9, also provided with a hole 7 on one side for the admission of the fluid to the inside of the valve when the hole 7 is in alinement with the inlet passage 2.

8 is a hollow cylinder having one end closed and the outside eccentric to the axis of the bore, and provided at the closed end with a bearing projection 9 and at its other end with a bearing projection 10,—said projections being in line with the axis of the bore, and in line with the axis of the cylindrical bore 4. Said cylinder 8 is also provided with the hole 11 held in alinement with the inlet passage 2 for the passage of the fluid to the inner side of the said cylinder 8, and for passage outwardly through passage 3, as designated by the arrow points in Fig. 1. The said cylinder 8 is also provided with the small hole 12 close to the bottom of the bore 4, for draining the bore or valve chamber. Said hollow cylinder 8 hereinafter will be designated as "eccentric 8," in referring to same.

Referring to Fig. 8, 13 is the stem on the operating device having a round bottom 14 provided with lugs 15 which fit into the slots 16 of the valve as shown in Fig. 9 for the purpose of operating or turning said valve. 17 is a cap screwed on the top of the valve chamber to prevent leakage and as a guide to the operating stem 13; and said cap is provided with a packing nut 18. The stem 9 of the eccentric 8 is journaled in the stem of the operating device at 19.

In operating the cock, a quarter-turn of the handle, which may be fitted on the stem 13, will suffice to open and close the cock. The eccentric 8 is placed within the valve chamber, the projection at the bottom of same fitted in the lower part of said chamber having its high side toward the inlet 2 and held in place by pin 20; the valve 5 is then placed within the valve chamber having its thickest side turned away from the high side of the eccentric 8; then the operating stem is placed in position with the lugs 15 in the slots 16 of the valve and the projection 9 of the eccentric in the hole in the stem at 19. The cap is then placed in position and by turning the valve 5 the thick part of same will ride upon the high side of the eccentric 8 which will force the valve to its seat at the pressure required and governed by the force applied to the stem handle.

I use a valve constructed as shown with a slight resilient action to it for the purpose of more easily grinding the valve to its seat, and I do not use or depend upon such resilient action to hold the valve to its seat for operation.

In Fig. 4 I have shown a modification whereby the valve has its seat upon the outlet side of the valve chamber, and the cock is of a longitudinal construction. In this case, the eccentric 8 is journaled at its inner end within the inlet 2, and the valve 5 and eccentric 8 placed in the same relation for opening and closing as explained in Fig. 1, and as shown in Fig. 5.

In Figs. 6 and 7 I show a straightway cock or valve, with the valve seated on the outlet side and having an inserted seat on the valve composed of Babbitt metal, or any other substance suitable for the purpose, and in this valve the seat may be either on the outlet side or inlet side without changing its construction except to have the high side of the eccentric 8, on the side desired to be closed; and I also in this case depend entirely upon the eccentric for pressing the valve to its seat, and in this construction I have a hole 21 through the eccentric in alinement with the inlet and outlet.

In Fig. 13 I show a modification of an eccentric which is cut away on one side.

I do not confine myself to an exact eccentric 8, as a cam is equivalent to the same within the limits as it is used and may be used to the same end and means as that shown.

I claim:

1. In a faucet or valve; a cylindrical valve chamber provided with an inlet and an outlet, a hollow cylindrical valve having its inside wall eccentric to its outside, and slotted its entire length for resilient action; a hollow cylindrical eccentric with its axis in line with the axis of the valve and valve chamber and provided with an inlet and an outlet and held in a stationary position whereby its eccentric part engages with the eccentric part of the valve when said valve is closed.

2. In a faucet or valve having a cylindrical valve chamber provided with an inlet and an outlet, a hollow cylindrical valve slotted its entire length for resilient action and the inner wall eccentric to its outside, a hollow cylindrical eccentric ported for inlet and outlet and having its high side in or nearly in alinement with the valve seat in the valve chamber and held in said position whereby by the turning of the valve for closing, causes the thick part of same to ride upon the eccentric, which forces said valve to its seat, and turning in an opposite direction, releases same.

Signed by me at Providence, R. I., in presence of two subscribing witnesses.

WALTER E. TAFT.

Witnesses:
 CHAS. W. EDDY,
 W. S. MARSH.